(12) United States Patent
Stucker

(10) Patent No.: US 10,699,819 B2
(45) Date of Patent: Jun. 30, 2020

(54) UF$_6$ TRANSPORT AND PROCESS CONTAINER (30W) FOR ENRICHMENTS UP TO 20% BY WEIGHT

(71) Applicant: Westinghouse Electric Company LLC, Cranberry Township, PA (US)

(72) Inventor: David L. Stucker, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/404,125

(22) Filed: May 6, 2019

(65) Prior Publication Data

US 2019/0341161 A1 Nov. 7, 2019

Related U.S. Application Data

(60) Provisional application No. 62/667,690, filed on May 7, 2018.

(51) Int. Cl.
| | |
|---|---|
| *G21F 5/08* | (2006.01) |
| *G21F 5/002* | (2006.01) |
| *B65D 25/14* | (2006.01) |
| *B65D 25/02* | (2006.01) |
| *B65D 25/34* | (2006.01) |

(52) U.S. Cl.
CPC .............. *G21F 5/08* (2013.01); *B65D 25/02* (2013.01); *B65D 25/14* (2013.01); *B65D 25/34* (2013.01); *G21F 5/002* (2013.01)

(58) Field of Classification Search
USPC .......................................... 250/506.1, 507.1
See application file for complete search history.

(56) References Cited

U.S. PATENT DOCUMENTS

| | | | | |
|---|---|---|---|---|
| 2,910,418 A | * | 10/1959 | Creutz | ................... G21C 15/00 376/362 |
| 3,228,848 A | * | 1/1966 | Fellows | ................. C07C 51/353 376/323 |
| 3,228,849 A | * | 1/1966 | Fellows | .................... G21C 3/64 376/323 |

(Continued)

FOREIGN PATENT DOCUMENTS

WO    2017118652 A1    7/2017

OTHER PUBLICATIONS

International Search Report and Written Opinion Issued for PCT/US2019/031027, dated Aug. 22, 2019.

*Primary Examiner* — Kiet T Nguyen
(74) *Attorney, Agent, or Firm* — K&L Gates LLC

(57) ABSTRACT

The invention relates to UF$_6$ transport and process containers to store UF$_6$ enriched up to 20 percent by weight $^{235}$U in amounts up to 1,500 kg U. The containers include a shell, which has an integral heat exchanger positioned between the exterior and interior surfaces/substrates of the shell. The integral heat exchanger is composed of metal passage voids to pass heat transport fluid. The shell forms an inner chamber, and a partition configuration is positioned within the inner chamber, extending longitudinally along the length of the container, to form a plurality of individual compartments within the inner chamber to store the UF$_6$. The containers may be produced by additive manufacturing methods.

16 Claims, 5 Drawing Sheets

(56) References Cited

U.S. PATENT DOCUMENTS

| | | | |
|---|---|---|---|
| 3,228,850 A * | 1/1966 | Fellows | G21C 3/28 376/323 |
| 2010/0155626 A1 | 6/2010 | Dougherty | |
| 2011/0168600 A1 | 7/2011 | Hilbert et al. | |
| 2014/0001381 A1 | 1/2014 | Dougherty | |
| 2015/0213911 A1 | 7/2015 | Olma et al. | |

\* cited by examiner

UF$_6$ TRANSPORT AND PROCESS CONTAINER (30W) FOR ENRICHMENTS UP TO 20% BY WEIGHT

CROSS-REFERENCE TO RELATED APPLICATION

This application claims priority under 35 U.S.C. § 119(e) to U.S. Provisional Patent Application Ser. No. 62/667,690, filed on May 7, 2018, entitled "IMPROVED UF$_6$ TRANSPORT AND PROCESS CONTAINER (30W) FOR ENRICHMENTS UP TO 20% BY WEIGHT", which is herein incorporated by reference.

BACKGROUND

Field

This invention relates to improved UF$_6$ transport and process containers (30W) for enrichments up to 20 percent by weight $^{235}$U, and methods for producing the containers, such as, additive manufacturing methods.

Background Information

Currently, UF$_6$ transport and process containers (30B) for the nuclear fuel industry accommodate 1,500 kg U wherein the enrichment is limited to 5 percent by weight $^{235}$U. These UF$_6$ transport and process containers are not suitable for enrichments up to 20 percent by weight $^{235}$U. Table 1 herein shows the characteristics of the currently licensed UF$_6$ containers. The largest container that is currently licensed to transport 20 percent by weight $^{235}$U is the 5A/B cylinder, which is allowed to transport UF$_6$ having enrichment up to 100 percent by weight $^{235}$U. However, the 5A/B cylinder is only allowed to contain 24.95 kg UF$_6$ or approximately 16.9 kg U. This very small quantity is not amenable for use in commercial continuous processing due to the high rate of cylinder exchange, large capital investment in a fleet of very small cylinders, and the general lack of logistics support in terms of overpacks, autoclaves, and UF$_6$ transfer stations. All of the remaining cylinders in Table 1 require relicensing to accommodate 20 percent by weight enrichment. Additionally, the cylinders smaller than the 30B are made from high nickel alloy that require a significant cost to deploy a fleet of small containers.

Thus, there is a need in the art to design and develop novel UF$_6$ transport and process containers that accommodate enrichments up to 20 percent by weight $^{235}$U. It is preferred that these new containers are encompassed within the current industry 30B cylinder envelope to maximize the applicability of current existing UF$_6$ transport infrastructure, such as external interface dimensions, overpacks, rigging and lifting and existing cylinder test and design data. Further, it is preferred that the design of the new containers in terms of weight, static strength, dynamic strength, fire resistance, and drop resistance is as close as possible to the current 30B cylinder to minimize or eliminate the need for extensive testing while enabling the storage of UF$_6$ enriched up to 20 percent by weight $^{235}$U in amounts that closely approach or equal the currently licensed 1,500 kg U of the 30B cylinder (which is limited to 5 percent by weight or less $^{235}$U). Moreover, the operational lessons learned from decades of 30B cylinder experience are incorporated into the new design to address potential and/or anticipated operational and safety-related issues. Some of the improvements in the 30W cylinder design include recessing the valve and drain plug threaded connection to minimize the potential for bend or breakage damage and including an integral heat exchanger to eliminate the need for, and improve the effectiveness of, external heating and cooling required to extract product and collect product, respectively.

SUMMARY OF THE INVENTION

The invention provides novel UF$_6$ transport and process containers that store UF$_6$ enriched up to 20 percent by weight $^{235}$U in amounts up to 1,500 kg U.

In one aspect, the invention provides a UF$_6$ transport and process container including a cylinder formed of a metal material selected from stainless steel, carbon steel, nickel alloy, titanium alloy, aluminum alloy, ferritic alloy, and combinations or alloys thereof. The inner layers of the cylinder material may be doped with B$_4$C and optionally enriched in the $^{10}$B isotope or other suitable and compatible material that acts as a neutron poison, thereby providing a container for transport of UF$_6$ enriched to up to 20 percent by weight $^{235}$U. Material doped with neutron absorber material such as B$_4$C will have undoped alloy clad on the exterior and interior exposed surfaces to preclude corrosion/washout of the absorber material to the UF$_6$ or external environment.

In one of the preferred embodiments, the cylinder includes a shell having an outer wall and an inner wall. The metal material extends continuously from the outer wall to the inner wall, wherein a portion therein includes an absorber layer (e.g., metal/B$_4$C matrix) and an integral heat exchanger (e.g., metal w/passage voids used to pass the heat transport fluid). The shell forms an interior chamber, which has positioned therein a "hub and spoke" configuration that is structured to form a plurality of compartments to house/store the UF$_6$ that serve to minimize the neutronic size of the compartment by the presence of the absorber in the internal structures. The walls of the hub and the spokes extend longitudinally along the length of the cylinder. These walls are constructed of the metal material which extends continuously there through, wherein a portion includes an absorber layer (e.g., metal/B$_4$C matrix). The walls of the spokes will have perforations, e.g., openings, formed therein to equalize UF$_6$ gas pressure and liquid levels between chambers and to reduce weight. Other embodiments for the internal structures of the 30W cylinder include, but are not limited to, nested cylinders or polygons that all have the impact of reducing the mass of enriched UF$_6$ that can reside within the overall cylinder without having an intervening absorber structure interposed, so as to make the neutronics and criticality aspects of the 30W cylinder analogous to nested safe geometry chambers with interposed absorber to minimize any neutron multiplication or reflection from one chamber to another.

BRIEF DESCRIPTION OF THE DRAWINGS

A further understanding of the invention can be gained from the following description of the preferred embodiments when read in conjunction with the accompanying drawings, in which.

DESCRIPTION OF THE PREFERRED EMBODIMENTS

Figure 1:
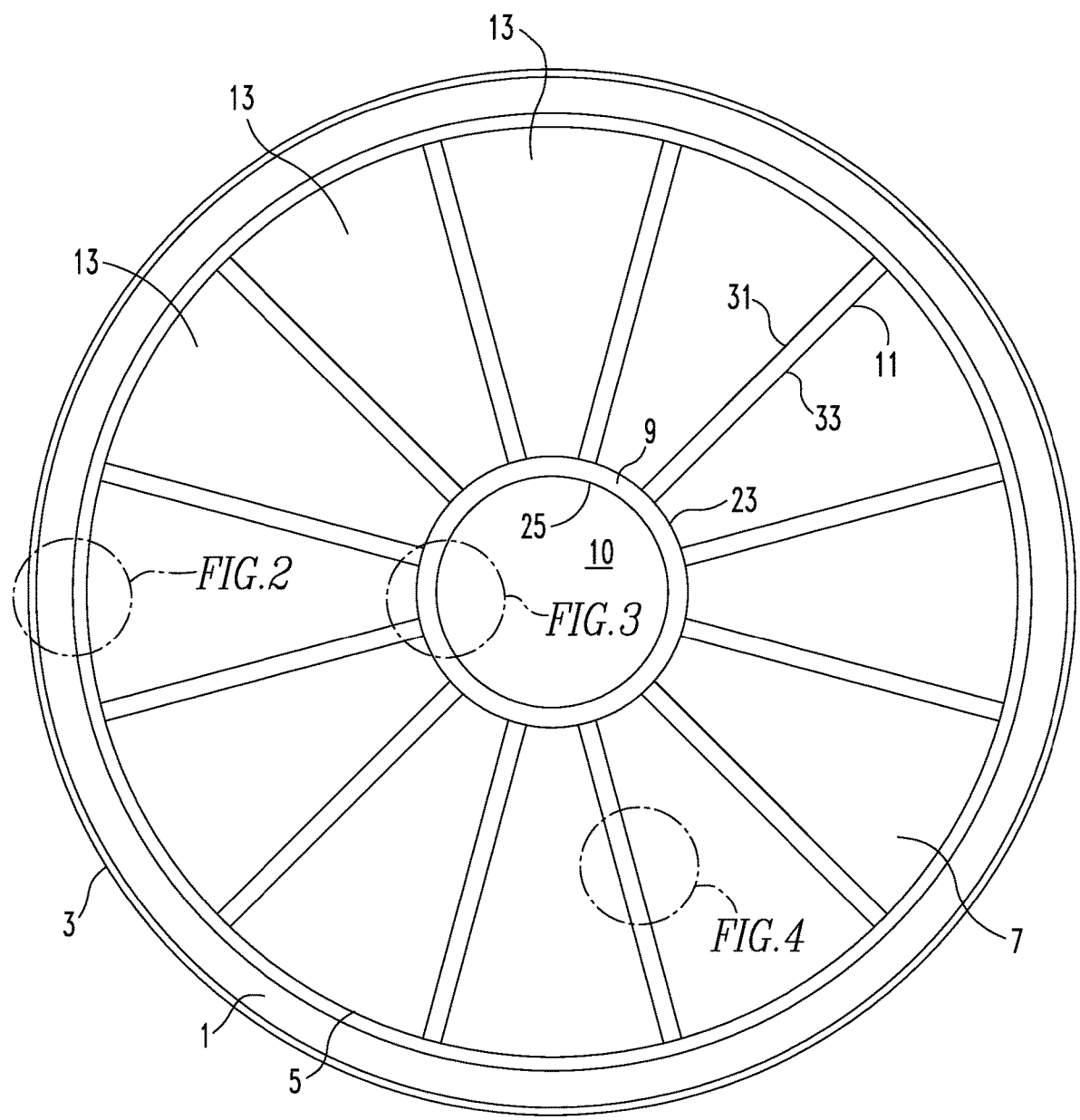
FIG. 1 is a schematic plan view of a 30W cylinder container, in accordance with certain embodiments of the invention.

This invention relates to improved $UF_6$ transport and process containers (30W) for enrichments up to 20 percent by weight $^{235}U$, and methods for producing the containers, such as, additive manufacturing methods. The invention uses novel designs and materials to provide improved $UF_6$ transport and process containers (30W) for enrichments up to 20 percent by weight $^{235}U$, without the need for crediting moderator exclusion, that is constrained to fit within the current industry 30B cylinder envelope, to maximize the applicability of current existing $UF_6$ transport infrastructure such as external interface dimensions, rigging and lifting, overpacks and existing cylinder mechanical and drop test and design data. The design of the 30W cylinders in terms of weight, static strength, dynamic strength, fire resistance, and drop resistance is specifically made as close as possible to the current art 30B cylinder to minimize or eliminate the need for extensive testing while enabling the storage of $UF_6$ enriched up to 20 percent by weight 235U in amounts that closely approach or equal the currently licensed 1,500 kg U of the 30B cylinder that is limited to 5 percent by weight or less 235U.

The material of construction for the new containers (30W) can be selected from a variety of known materials including stainless steel, carbon steel, nickel alloy, titanium alloy, aluminum alloy, ferritic alloy, and combinations or alloys thereof. In certain embodiments, the preferred material of construction is aluminum alloy or stainless steel alloy. These materials have higher corrosion resistance as compared to the current carbon steel material of construction known in the art. Furthermore, both of these materials have proven experience with $B_4C$ doping, which optionally may be enriched in the $^{10}B$ isotope that acts as a neutron poison and thereby enables the increase in enrichment up to 20 percent by weight $^{235}U$, while substantially increasing the mass of $UF_6$ allowed to be safely transported in the containers. The $^{10}B$ isotope may be included in the $B_4C$ in a range of enrichment of the $^{10}B$ isotope from natural (19.8 atom percent) to fully enriched (100%) $^{10}B$. The $B_4C$ doped material may be optionally enriched in the $^{10}B$ isotope or other such neutron absorber material that is compatible with the base alloy material.

The containers (30W) according to the invention are expected to be manufactured using additive manufacturing due to the need for: 1) corrosion resistant, exotic neutron absorber matrix materials required for criticality safety, 2) an objective to eliminate all seam welds to preclude periodic inspection requirements associated with welds, 3) an objective to include an integral heat exchanger into each cylinder to sublime and de-sublime $UF_6$ product within the cylinder, and 4) an objective to include design changes to address operational lessons-learned with the current art 30B cylinder including, but not limited to, recessed valve and drain plug connections. Additive manufacturing also enables the complex shapes and forms that are required to accomplish these design objectives.

The containers include a cylindrical shell that forms an exterior wall and an interior chamber. The shell is made of a multilayer composition/composite consisting of internal and external shell surfaces/substrates each constructed of metal or metal alloy, an integral heat exchanger and one or more layers of metal alloy doped with neutron absorbing material that is interposed on both sides of the integral heat exchanger, which is effective to minimize the impact of external reflection of neutrons, as well as the impact of multiple cylinders being shipped or stored together and the neutron transport between these cylinders. The 30W container design also includes internal features that provide fixed absorber material inside the cylinder to have the effect of reducing the neutronic size of the chambers within the cylinder to those of a geometrically safe size for the maximum enrichment to be held within the 30W cylinder. In all embodiments, the 30W cylinders have a nominal outer diameter of 28 inches so as to retain compatibility with the existing industry infrastructure associated with the current art 30B cylinder. The interior chamber will have an inner diameter small than that of the current art 30B cylinder that is necessitated by the multilayer shell composition/composite as described previously. The preferred embodiment of the interior chamber of the cylinders contains a "hub and spoke" configuration (e.g., wagon wheel structure). These internal features provide the additional fixed absorbers necessary to safely transport up to 20 percent by weight $^{235}U$, also provide additional static and dynamic strength to the cylinder wall and closure domes, and also serve as thermal fins to conduct heat into and away from the cylinder to sublime and de-sublime the contained $UF_6$, respectively.

In contrast, the current 30B cylinder known in the prior art consists of a hollow chamber within a cylinder and is absent of the hub and spoke configuration of the improved 30W container. The hub and spoke configuration provides improved mechanical strength and stability to the 30W cylinder as compared to the 30B cylinder.

Figure 6:
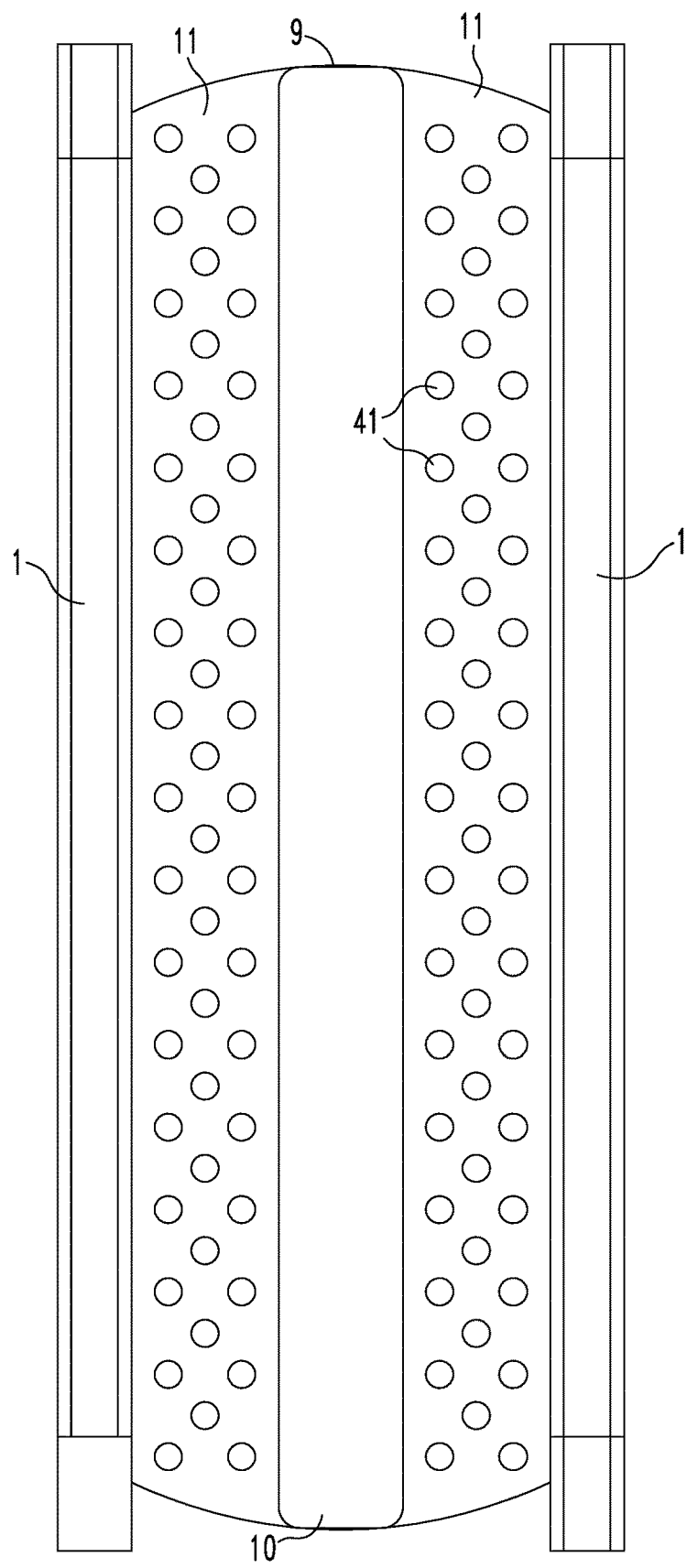
FIG. 6 is a schematic detail of the 30W cylinder container shown in FIGS. 1 and 5, in accordance with certain embodiments of the invention.

FIG. 1 shows a plan view of the 30W cylinder container in accordance with certain embodiments of the invention. As illustrated in FIG. 1, the cylinder includes a cylinder wall 1 that has an outer shell 3 and an inner shell 5. The outer shell 3 forms the exterior surface of cylinder. The inner shell 5 is structured to form an interior chamber 7. Positioned within the interior chamber 7 is the cylindrical hub wall 9 and the plurality of spokes 11. The hub wall 9 includes an outer shell 23 and an inner shell 25, and each of the spokes 11 include an outer surface 31 and an inner surface 33. Each of the spokes 11 extend radially from the outer shell 23 of the hub wall 9 to the inner shell 5 of the cylinder wall 1. The hub wall 9 and the spokes 11 extend along the longitudinal length of the cylinder (as shown in FIG. 6), and are structured to form individual compartments 13 within the interior chamber 7. The hub wall 9 forms a cavity or space 10 therein, e.g., in the center of the cylinder. The multiple compartments 13 (e.g., containing $UF_6$, not shown) are not hydraulically isolated from one another. For example, the hub wall 9 and/or the spokes 11 can be constructed of a material having perforations 41 (as shown in FIG. 6) such that one of the compartments 13 may communicate with adjacent compartments 13 in the interior chamber 7. For example, $UF_6$ gas may communicate from one of the compartments 13 to another through the perforations 41 formed in the outer and inner surfaces 31,33, respectively, of the spokes 11.

Figure 2:
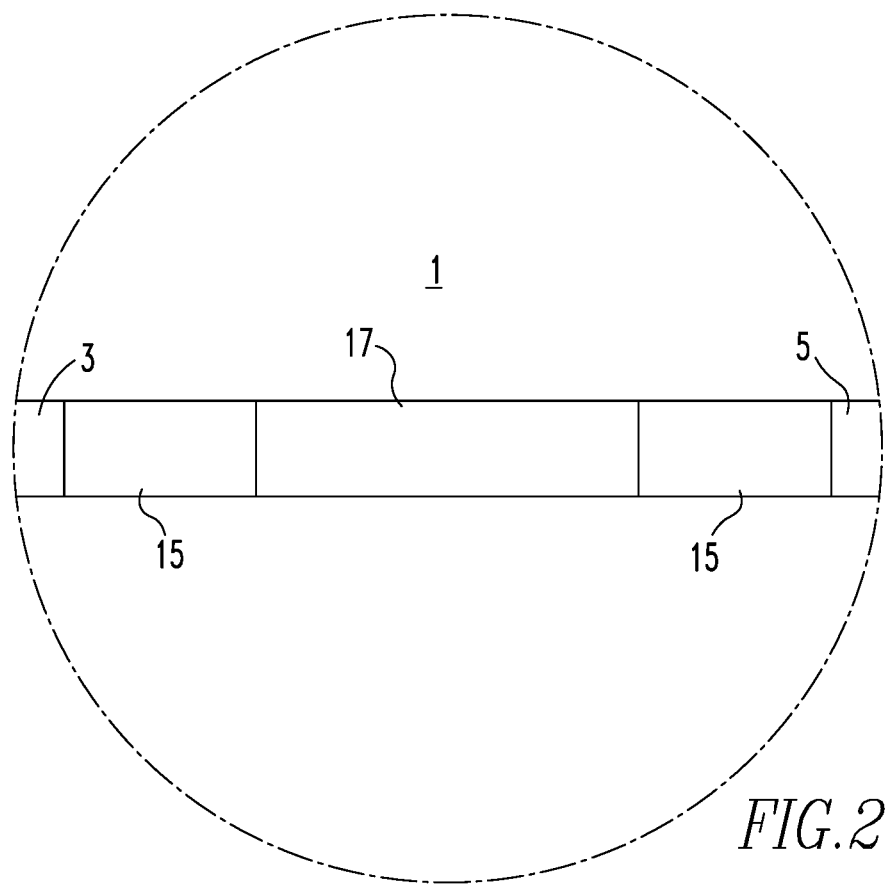
FIG. 2 is a schematic detail of the cylinder wall 1 shown in FIG. 1, in accordance with certain embodiments of the invention.

FIG. 2 is a detailed plan view of the cylinder wall 1 in FIG. 1. The cylinder wall 1 is typically constructed of metal. As aforementioned, the metal may be selected from stainless steel, carbon steel, nickel alloy, titanium alloy, aluminum alloy, and ferritic alloy. As shown in FIGS. 1 and 2, the cylinder wall 1 includes the outer shell 3 and the inner shell 5 that are each constructed of metal. The metal outer shell 3 forms the exterior surface of the cylinder wall 1. The metal inner shell 5 forms the interior surface of the cylinder wall 1. The metal, e.g., aluminum alloy, extends continuously from the outer shell 3 to the inner shell 5, wherein a portion has incorporated therein an absorber layer 15 (e.g., Al alloy/$B_4C$ matrix) and an integral heat exchanger 17, such as, aluminum alloy with passage voids 35 (shown in FIG. 7). As shown in FIG. 2, the heat exchanger 17 may be interposed between the absorber layer 15. The passage voids 35 of the heat exchanger 17 can be a variety of shapes. In certain embodiments, a helical heat exchanger has square-shaped voids. Without intending to be bound by any particular theory, it is believed that the square shape is easily formed during the additive manufacturing process, e.g., three-dimensional printing, that may be employed to produce the metal cylinder wall 1. The passage voids 35 will carry the fluid used for heat transfer to and from the 30W cylinder such as steam, chilled/heated water, Freon, and other similar fluids capable of both heating and cooling at reasonable pressures that are also compatible with the cylinder materials of construction.

The outer shell 3 serves as a protective layer for the integral heat exchanger 17. The inner shell 5 serves as the pressure boundary for the $UF_6$ that may be stored in the compartments 13 of the interior chamber 7 of the cylinder.

Figure 3:
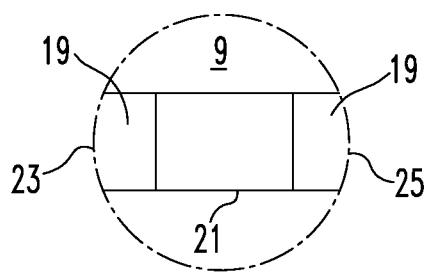
FIG. 3 is a schematic detail of the hub wall 9 shown in FIG. 1, in accordance with certain embodiments of the invention.

FIG. 3 is a detailed plan view of the hub wall 9 in FIG. 1. The hub wall 9 is typically constructed of metal. As aforementioned, the metal may be selected from stainless steel, carbon steel, nickel alloy, titanium alloy, aluminum alloy and ferritic alloy. As shown in FIG. 3, the hub wall 9 includes a metal layer 19 and an absorber layer 21 positioned between the outer and inner shells 23,25, respectively. As shown in FIG. 3, the metal, e.g., Al alloy, extends continuously from the outer shell 23, e.g. one end, of the hub wall 9 to the inner shell 25, e.g., an opposing end, of the hub wall 9, wherein a portion of this metal has interposed therein the absorber layer 21 (e.g., Al alloy/$B_4C$ matrix).

Figure 4:
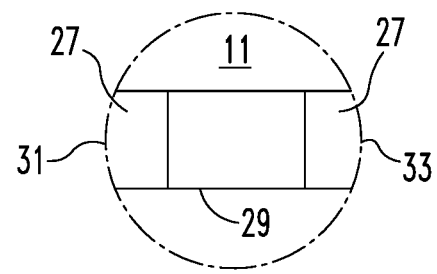
FIG. 4 is a schematic detail of one of the spokes 11 shown in FIG. 1, in accordance with certain embodiments of the invention.

FIG. 4 is a detailed plan view of one of the spokes 11 in FIG. 1. Each of the spokes 11 is typically constructed of metal. As aforementioned, the metal may be selected from stainless steel, carbon steel, nickel alloy, titanium alloy, aluminum alloy and ferritic alloy. The spokes 11 include a metal strut/fin 27 and an absorber layer 29 positioned between the outer surface 33 and the inner surface 31. As shown in FIG. 4, the metal, e.g., aluminum alloy, extends continuously from the outer surface 31, e.g., one end, of the strut/fin 27 to the inner surface 33, e.g., an opposing end, of the strut/fin 27, wherein a portion of this metal has interposed therein the absorber layer 29 (e.g., Al alloy/$B_4C$ matrix).

Figure 5:
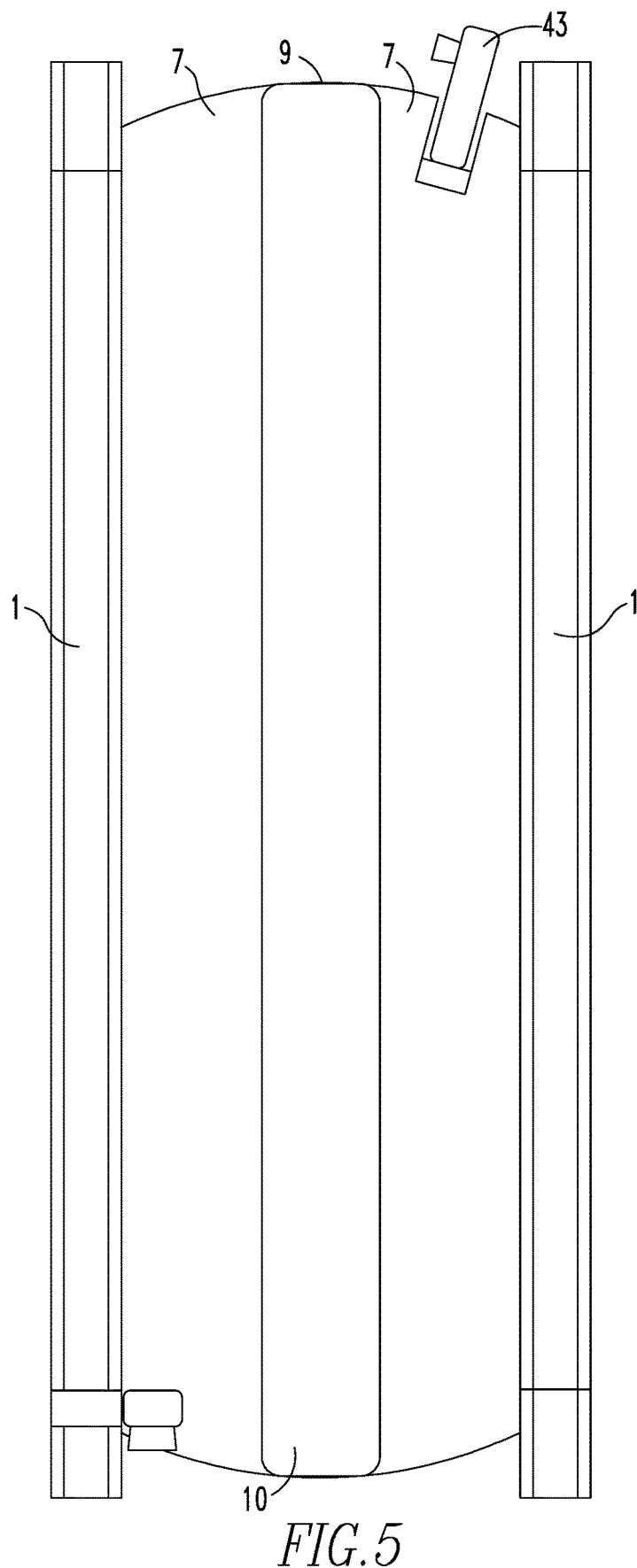
FIG. 5 is a schematic elevation view of the 30W cylinder container shown in FIG. 1, in accordance with certain embodiments of the invention.

FIG. 5 is an elevation view of the cylinder in FIG. 1. As shown in FIG. 5, the hub wall 9 and the space 10 formed therein are positioned in the center of the interior chamber 7 of the cylinder and the remainder of the interior chamber 7 is formed around, e.g., surrounding, the hub wall 9, e.g., between its outer shell 23 and the inner shell 5 of the cylinder wall 1 (e.g., which include the compartments 13), and extending longitudinally along the length of the cylinder. Further, the cylinder wall 1 is illustrated on the far left and far right of the cylinder, and the fill valve 43 is positioned at the top of the cylinder to allow for filling the interior chamber 7.

FIG. 6 is a detailed elevation view of the cylinder in FIG. 1. As shown in FIG. 6, the space 10 formed by the hub wall 9 is positioned in the center of the cylinder and the spokes 11 are positioned to extend radially from the hub wall 9, extending longitudinally along the length of the cylinder. In FIG. 5, each of the spokes 11 is constructed of a material having perforations 41 formed therein. Further, the cylinder wall 1 is illustrated on the far left and far right of the cylinder.

Figures 7, 8:
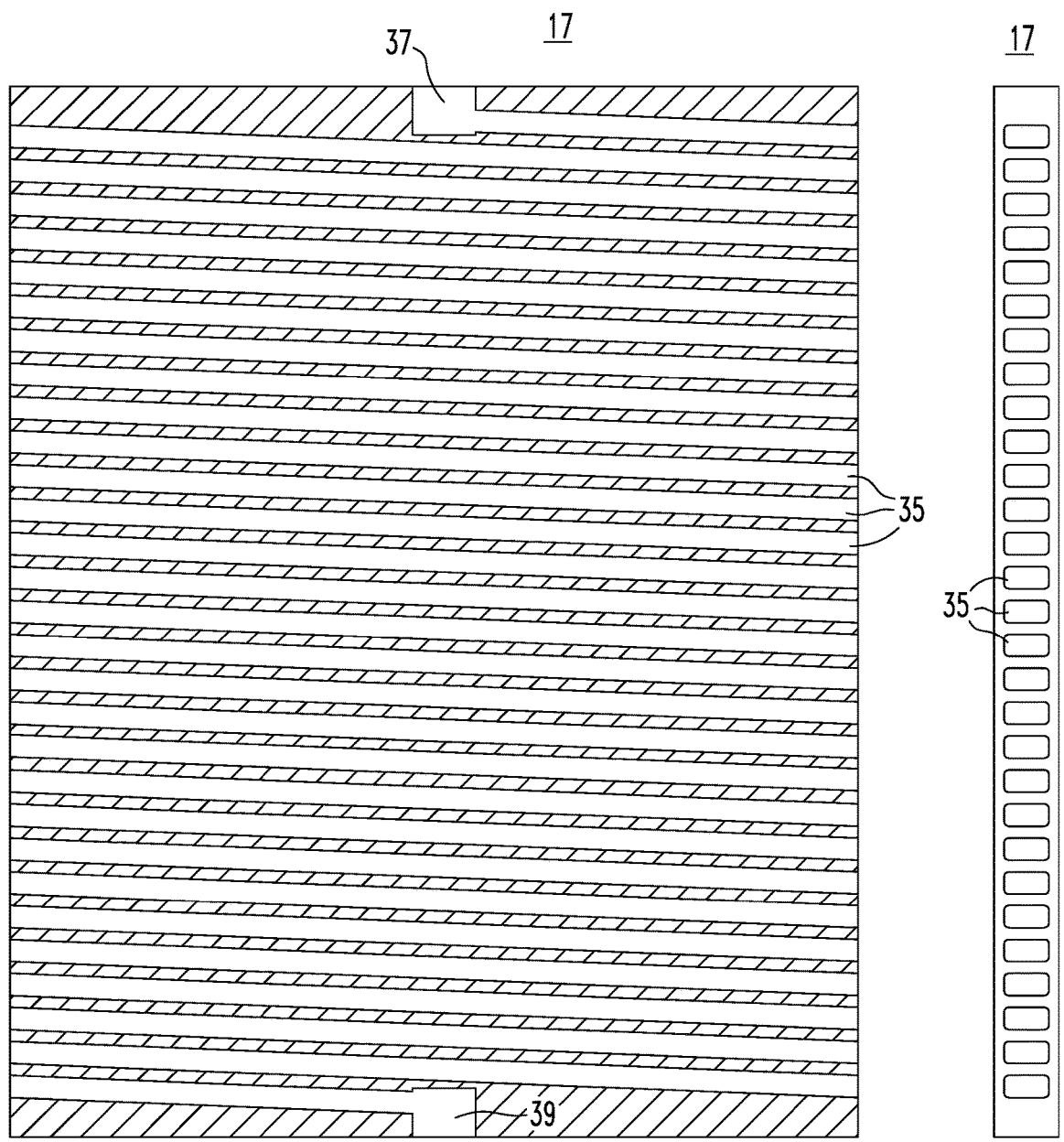
FIG. 7 is a schematic detail of an unrolled view of the integral heat exchanger 17 shown in FIG. 2, in accordance with certain embodiments of the invention.
FIG. 8 is a schematic detail of a side section view of the integral heat exchanger 17 shown in FIGS. 2 and 7, in accordance with certain embodiments of the invention.

FIG. 7 is a detailed unrolled view of the integral heat exchanger 17 shown in FIG. 2 in which the left side of the drawing connects with the right side at the same elevation. The integral heat exchanger includes an inlet 37, an outlet 39 and passage voids 35 extending between the inlet 37 and the outlet 39. The fluid for heat transfer enters the integral heat exchanger 17 through the inlet 37, flows through the passage voids 35, and exits the integral heat exchanger 17 through the outlet 39. FIG. 8 is a detailed side section view of the integral heat exchanger 17 shown in FIG. 2, which includes passage voids 35 there through.

In certain embodiments, the 30W cylinder is an external package that is identical in interfaces to the current industry standard 30B cylinder. This design constraint maximizes the value of the current infrastructure of overpacks, material handling and storage racks. This embodiment of the 30W cylinder also includes an integral heat exchanger which is intended to replace the need for a separate autoclave to heat the cylinder to extract product by driving sublimation or of refrigerated equipment and containers to cool the cylinder, either when filled with hot liquid $UF_6$ at an enrichment product filling station or as a cold trap to de-sublime gaseous $UF_6$ that may be used at various points in an enrichment cascade or other $UF_6$ processing requiring the evacuation of gaseous material from the process. The integral heat exchanger is completely isolated from the $UF_6$ product by a heat exchanger wall and an exterior cylinder wall structure. The integral heat exchanger is included in order to preclude the potential criticality event of a flooded steam autoclave as well as accelerating the process of heating the cylinder to extract product by driving sublimation or of refrigerated equipment and containers to solidify product for transport. The 30W cylinder also includes internal structures that will serve as a combination of structural members to increase strength and stiffness, fixed absorbers and thermal fins to conduct heat to and from the $UF_6$ and the external heat exchanger. These internal structures incorporate fixed absorbers and are arranged in a manner to provide the absorber necessary to maintain the package and its contents at or below the required $k_{eff}$, including the necessary safety margins under the most limiting accident conditions.

Constraining the mechanical interfaces for the 30W cylinder to those of the current art 30B cylinder allows for maximizing the credit that can be taken for the use of existing 30B test data, thereby minimizing the cost and time for deploying the 30W cylinder. The use of composite materials that include neutron poisons as part of the design are necessary to enable the ability to contain quantities of 20 percent by weight $^{235}U$ material approaching the currently licensed 1,500 kg U. The ability to contain quantities of $UF_6$ approaching that of the current 30B cylinder is considered highly desirable to maintaining constant material process flow into deconversion facility. Further, inclusion of an integral heat exchanger is a novel feature that eliminates the need for a separate autoclave to sublime and de-sublime the $UF_6$ material and enable the ability exclude the use of a steam autoclave and its potential negative impacts on criticality safety.

As aforementioned, the current 30B cylinder utilizes steel (ASTM-A516) as the material of construction. The preferred embodiment of the 30W cylinder is made of aluminum alloy material with integral fixed absorber to minimize weight and allow the inclusion of the internal absorber structures that are required to enable storage of 20 percent by weight $^{235}U$ as $UF_6$. The use of the lighter aluminum alloy material of construction will also mimic the strength and stiffness of the current 30B cylinder. Aluminum alloys are proven to be compatible with $UF_6$ and are used extensively as material of construction in enrichment cascades where the aluminum passivates to the fluorine, HF and $UF_6$ typically present in $UF_6$ systems, by forming a tightly adherent layer of aluminum fluoride ($AlF_3$) that precludes further corrosion. Aluminum alloys also have significant advantages over steel in terms of significantly higher thermal conductivity combined with superior internal and external surface corrosion resistance.

The complexities of the 30W design requirements are not easily manufacturable using conventional absorber-bearing materials due to limitations in bending, welding and machining. As a result, additive manufacturing is proposed to print the complex shapes of the preferred embodiment in aluminum alloy surfaces with aluminum-$B_4C$ composite on the interior of the shape. The use of additive manufacturing will eliminate the need for conventional welding and the relate surveillance during the cylinder lifetime. Additive manufacturing will also enable features such as thickness variations of the internal structures to optimize the performance as thermal fins and features such as perforations in the internal structures, and variations of the amount of absorber incorporated into the specific part of the cylinder. For example, it is expected that the region of the closure domes in the region of the fill valve, the integral heat exchanger and the skirts would be aluminum alloy.

For ease of description, the foregoing disclosure and corresponding figures describe and illustrate containers in the shape of a cylinder. However, as aforementioned, the containers according to the invention are not limited to a particular or specific shape. Furthermore, the internal structures of the 30W containers are not limited to the foregoing hub and spoke configuration that is described and illustrated. For example, the internal structure may include nested cylinders or polygons. As aforementioned, these configurations have the impact of reducing the mass of enriched $UF_6$ that can reside within the overall cylinder without having an intervening absorber structure interposed, so as to make the neutronics and criticality aspects of the 30W cylinder analogous to nested safe geometry chambers with interposed absorber to minimize any neutron multiplication or reflection from one chamber to another.

The invention includes one or more of the following novel concepts:
(i) Use of absorber-bearing materials of construction of the basic storage cylinder to enable the storage of up to 20 percent by weight $^{235}U$ enrichment as $UF_6$;
(ii) Use of absorber-bearing materials of construction within the cylinder to enable the storage of up to 20 percent by weight $^{235}U$ enrichment as $UF_6$;
(iii) Use of an integral heat exchanger to obviate the need for, and the criticality complications of, a potentially water-flooded steam autoclave;
(iv) Use of complex shapes within the cylinder to serve as thermal fins to act in concert with the integral heat exchanger to provide improved control of $UF_6$ sublime/de-sublime rate;
(v) Combination of the integral heat exchanger and internal fins to minimize the amount of $UF_6$ heel remaining as the cylinder is emptied by subliming the $UF_6$ by providing efficient heat transfer from the integral heat exchanger through the internal structural features acting as fins to more effectively heat and sublime the product $UF_6$ material; and
(vi) Combination of the integral heat exchanger and internal fins to minimize the amount of time necessary to solidify liquid $UF_6$ after filling by providing efficient heat transfer from the integral heat exchanger through the internal structural features acting as fins to more effectively cool and de-sublime the product $UF_6$ material.

While the invention has been described in terms of various specific embodiments, those skilled in the art will recognize that the invention can be practiced with modifications within the spirit and scope of the appended claims.

TABLE 1

| Model Number | Nominal Diameter (mm) | (in) | Material of Construction | Minimum Volume $m^3$ | $ft^3$ | Approximate Tare Weight (kg) | (lb) | Maximum enrichment (w/o $^{235}U$) | Maximum Fill Limit (kg) | (lb) |
|---|---|---|---|---|---|---|---|---|---|---|
| 1S | 40 | 1.6 | Nickel | 0.0002 | 0.0053 | 0.79 | 1.75 | 100.0 | 0.45 | 1.0 |
| 2S | 90 | 3.5 | Nickel | 0.0007 | 0.0256 | 1.91 | 4.20 | 100.0 | 2.22 | 4.9 |
| 5A | 130 | 5 | Nickel | 0.0080 | 0.284 | 25 | 55 | 100.0 | 24.95 | 55 |
| 5B | 130 | 5 | Nickel | 0.0080 | 0.284 | 25 | 55 | 100.0 | 24.95 | 55 |
| 8A | 205 | 8 | Nickel | 0.0374 | 1.319 | 55 | 120 | 12.5 | 116 | 255 |
| 12A | 305 | 12 | Nickel | 0.0674 | 2.380 | 84 | 185 | 5.0 | 209 | 460 |
| 12B | 305 | 12 | Nickel | 0.0674 | 2.380 | 84 | 185 | 5.0 | 209 | 460 |
| 30B | 700 | 28 | Steel | 0.7360 | 26.000 | 635 | 1,400 | 5.0 | 2,275 | 5,020 |
| 48A | 1,220 | 48 | Steel | 3.0800 | 108.900 | 2,041 | 4,500 | 4.5 | 9,540 | 21,030 |
| 48X | 1,220 | 48 | Steel | 3.0800 | 809.000 | 2,041 | 4,500 | 4.5 | 9,450 | 21,030 |
| 48F | 1,220 | 48 | Steel | 3.9600 | 140.000 | 2,360 | 5,200 | 4.5 | 12,260 | 27,030 |
| 48Y | 1,220 | 48 | Steel | 4.0400 | 142.700 | 2,360 | 5,200 | 4.5 | 12,500 | 27,560 |
| 48T | 1,220 | 48 | Steel | 3.0400 | 107.200 | 1,111 | 2,450 | 1.0 | 9,390 | 20,700 |
| 48O | 1,220 | 48 | Steel | 3.8200 | 135.000 | 1,202 | 2,650 | 1.0 | 11,825 | 26,070 |
| 48G | 1,220 | 48 | Steel | 3.9600 | 139.000 | 1,202 | 2,650 | 1.0 | 12,175 | 26,840 |

The invention claimed is:

1. A $UF_6$ transport and process container to store $UF_6$ enriched up to 20 percent by weight $^{235}U$ in amounts up to 1,500 kg U, comprising:
   a shell, comprising:
      an exterior surface/substrate;
      an interior surface/substrate;
      an integral heat exchanger positioned between the exterior and interior surfaces/substrates, the integral heat exchanger comprising:
         metal; and
         passage voids to pass heat transport fluid;
      an inner chamber formed by the shell; and
      a partition configuration positioned within the inner chamber and extending longitudinally along the length of the container, to form a plurality of individual compartments within the inner chamber to store the $UF_6$.

2. The container of claim 1, wherein said container is the shape of a cylinder.

3. The container of claim 1, wherein the exterior and interior surfaces/substrates are formed of metal selected from stainless steel, carbon steel, nickel alloy, titanium alloy, aluminum alloy, ferritic alloy, and combinations or alloys thereof.

4. The container of claim 3, wherein the metal extends continuously from the exterior surface/substrate to the interior surface/substrate.

5. The container of claim 4, wherein a portion of the shell includes an absorber layer formed between the exterior and interior surfaces/substrates and optionally positioned on each side of the integral heat exchanger.

6. The container of claim 5, wherein the absorber layer comprises the metal doped with $B_4C$ and optionally enriched in $^{10}B$ isotope or other such neutron absorber material that is compatible with the metal.

7. The container of claim 1, wherein the exterior and interior surfaces/substrates are undoped.

8. The container of claim 1, wherein the partition configuration is selected from a hub and spokes configuration, and/or nested geometric shapes corresponding to the shape of the shell.

9. The container of claim 8, wherein the hub and spokes are constructed of a material selected from metal and metal alloy.

10. The container of claim 9, wherein the metal is selected from stainless steel, carbon steel, nickel alloy, titanium alloy, aluminum alloy, ferritic alloy, and combinations or alloys thereof.

11. The container of claim 10, wherein the metal extends continuously from an exterior wall to an interior wall of each of the hub and spokes.

12. The container of claim 11, wherein an absorber layer is formed between the exterior and interior walls.

13. The container of claim 12, wherein the absorber layer comprises the metal doped with $B_4C$ and optionally enriched in $^{10}B$ isotope or other such neutron absorber material that is compatible with the metal.

14. The container of claim 11, wherein voids or passages are formed in the spokes extending from the exterior wall to the interior wall.

15. A method of producing the container of claim 1, wherein the shell and/or the partition configuration are/is formed using an additive manufacture process.

16. The method of claim 15, wherein the additive manufacture process comprises three-dimensional printing.

* * * * *